US006442119B1

(12) United States Patent
Sunagawa

(10) Patent No.: US 6,442,119 B1
(45) Date of Patent: Aug. 27, 2002

(54) METHOD AND APPARATUS FOR RECORDING OPTICAL INFORMATION

(75) Inventor: Ryuichi Sunagawa, Takasaki (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 0 days.

(21) Appl. No.: 09/467,445

(22) Filed: Dec. 20, 1999

(30) Foreign Application Priority Data

Dec. 21, 1998 (JP) ............................................ 10-362028

(51) Int. Cl.$^7$ ................................................ G11B 7/00
(52) U.S. Cl. ................. 369/47.53; 369/116; 369/59.11; 369/53.26
(58) Field of Search ............................. 369/116, 59.12, 369/59.14, 59.13, 47.53, 47.51, 53.26, 53.27, 53.31, 44.31, 47.55, 59.11

(56) References Cited

U.S. PATENT DOCUMENTS

| | | | | |
|---|---|---|---|---|
| 5,475,666 A | * | 12/1995 | Ito et al. ..................... | 369/116 |
| 5,502,702 A | * | 3/1996 | Nakajo ........................ | 369/116 |
| 5,663,941 A | * | 9/1997 | Aoshima ..................... | 369/116 |
| 5,740,149 A | * | 4/1998 | Iwasaki et al. ............. | 369/116 |
| 5,784,355 A | * | 7/1998 | Abe ............................. | 369/116 |
| 6,111,841 A | * | 8/2000 | Iida et al. .................... | 369/116 |
| 6,205,102 B1 | * | 3/2001 | Spruit ......................... | 369/116 |

FOREIGN PATENT DOCUMENTS

JP          04053042 A   *   2/1992

* cited by examiner

Primary Examiner—Thang V. Tran
(74) Attorney, Agent, or Firm—Katten Muchin Zavis Rosenman

(57) ABSTRACT

A method and apparatus is capable of recording optical information at high speed without using a high power laser beam. An intensity of a laser beam required in forming a land during recording optical information on an optical information recording medium is set to have a larger value for a greater linear velocity between a light source and the optical information recording medium such as an optical disc. As a result, a potion of the optical information recording medium in which a pit is to be formed can be sufficiently preheated even at the greater linear velocity, so that the pit can be formed without increasing an intensity of the laser beam required in forming pits.

14 Claims, 8 Drawing Sheets

METHOD AND APPARATUS FOR RECORDING OPTICAL INFORMATION

FIELD OF THE INVENTION

The present invention relates to a method and apparatus for recording optical information; and, more particularly, to a method and apparatus capable of recording optical information at high speed without increasing the laser power required in forming pits.

DESCRIPTION OF THE PRIOR ART

An optical recording technique has been widely used in storing a large volume of information, in which the information is optically recorded in an optical information recording medium, e.g., such an optical disk as CD-recordable (CD-R) or the like. Recently, there has been introduced a technique to record the optical information at a speed of or beyond 2 to 6 times the standard recording speed.

Recording of information on the optical disc is accomplished by irradiating a pulsed laser beam on the rotating optical disc based on a digital signal, which has been obtained by digitizing the information to be recorded, to thereby form pits on the disk.

In order to form the pits on the optical disc based on the digital signal, a high intensity laser beam is irradiated on the optical disc during a high level of the digital signal, wherein the laser power causes the change of states of the irradiated recording layer to form the pits. During a low level of the digital signal, a low intensity laser beam required for tracking is irradiated on the disk.

High speed recording can be achieved by rotating an optical disk at an increased speed and reducing the period of a digital signal according to the rotational speed of the disc.

In case of a dye-based recordable optical disc, pits are formed on a recording layer of the optical disc by the thermal energy delivered by the irradiated laser beam. Accordingly, if an intensity of the laser beam is not sufficient enough, the high speed recording of the optical information may result in the formation of incomplete pits or no pit formation at all.

To be specific, the intensity of the laser beam irradiated on the optical disc varies according to the digital signal as illustrated in FIG. 2. For instance, if the intensity of the laser beam being irradiated on the optical disc is set to be high during the high level H of the digital signal, the thermal energy delivered to the optical disc gradually increases while the high intensity laser beam is provided and starts to decrease gradually once the intensity of the laser beam becomes low. Pits are formed on portions of the recording layer exposed to a temperature equal to or greater than a threshold temperature, at which change of states of the recording layer begins to occur.

An excessive portion of the thermal energy supplied to form a pit is transferred to and dissipated in the surrounding region of the pit, serving to preheat a portion of the recording layer in which a next pit is to be formed.

However, as a relative velocity between the optical disc and a laser beam source increases with an increase of a rotational speed of the optical disc, the excessive thermal energy provided by the thermal energy supplied by the irradiation of the laser beam onto the optical disc decreases as shown in FIG. 3, which in turn often results in incomplete pit formation or no pit formation at all. Consequently, it has been required to increase the laser power for the formation of the proper pits with the increasing relative velocity, necessitating a costly high power laser.

SUMMARY OF THE INVENTION

It is, therefore, an object of the present invention to provide a method and apparatus capable of recording optical information at high speeds without employing a high power laser.

In accordance with an aspect of the present invention, there is provided a method for recording optical information on an optical information recording medium, wherein optically detectable pits and lands having various lengths are formed by thermal energy provided by a pulsed laser beam irradiated on the optical information recording medium by a light source which has a first intensity level for forming a pit and a second intensity level for forming a land, the second intensity level being lower than the first intensity level, characterized in that the second intensity level is set corresponding to linear velocity of the medium.

In accordance with another aspect of the present invention, there is provided an apparatus for recording optical information on an optical information recording medium, wherein optically detectable pits and lands having various lengths are formed by thermal energy provided by a pulsed laser beam which has a first intensity level for forming a pit and a second intensity level for forming a land, the second intensity level being lower than the first intensity level, the apparatus comprising:

a light source for generating the laser beam; and second intensity setting means for setting the second intensity level corresponding to linear velocity of the medium.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Preferred embodiments of the present invention will now be described hereinafter with reference to the drawings.

Figure 1:
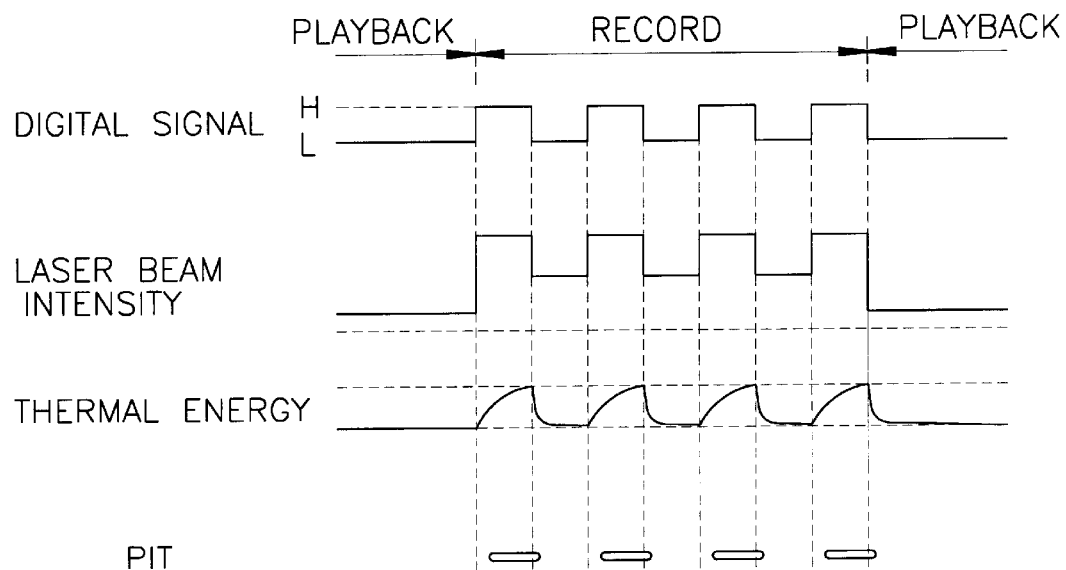
FIG. 1 illustrates a method for recording optical information in accordance with the present invention.
Figure 2:
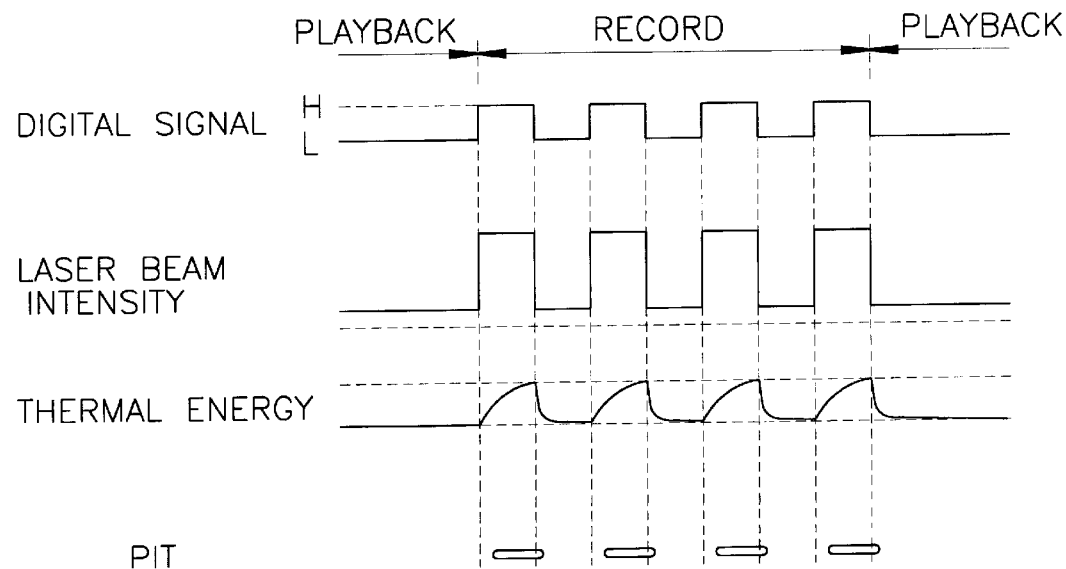
FIG. 2 represents a conventional method for recording optical information.
Figure 3:
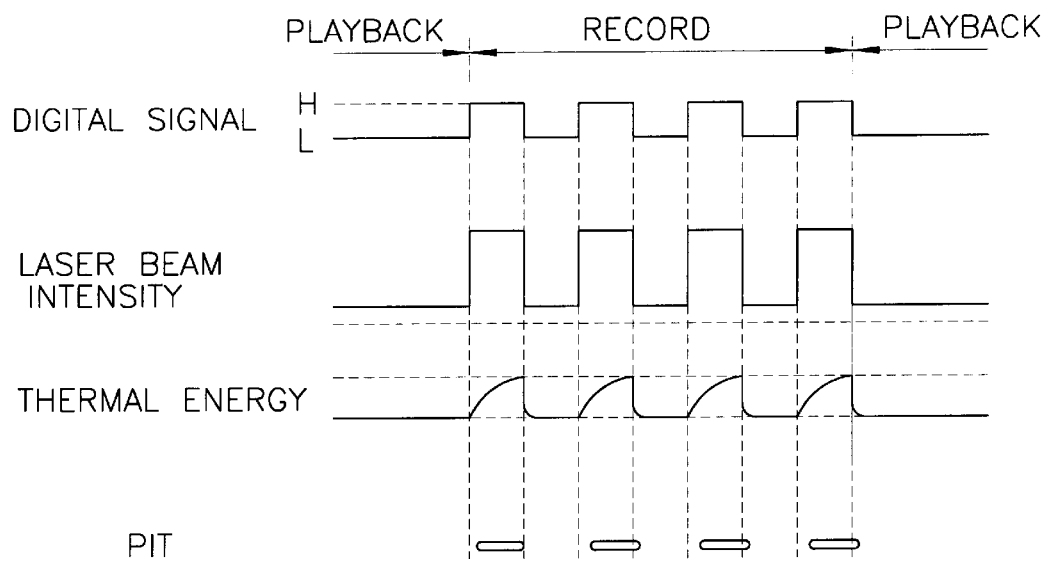
FIG. 3 shows drawbacks of the conventional method for recording the optical information at high speed.
Figure 4:
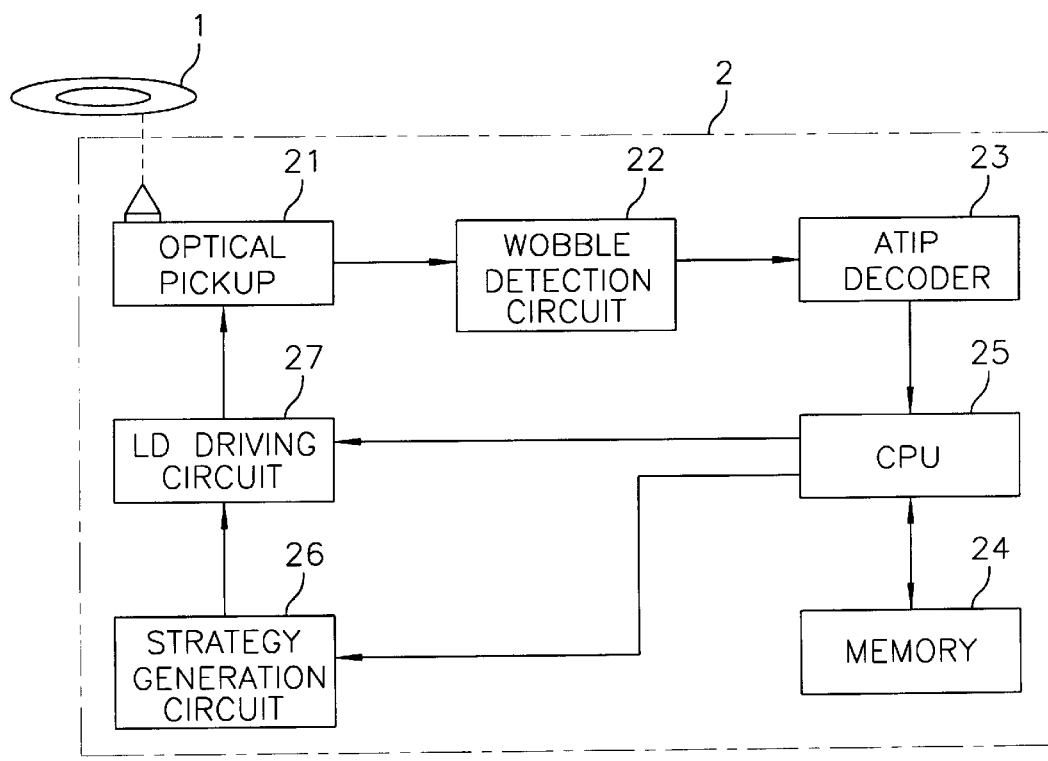
FIG. 4 is a block diagram for illustrating an optical information recording apparatus in accordance with the present invention.

Referring to FIG. 4, there is illustrated a block diagram representing an optical information recording system in accordance with the present invention. The system includes, e.g., a dye-based writable optical disc 1, which is generally referred to as a CD-recordable (CD-R), and an optical information recording apparatus 2.

The optical information recording apparatus 2 comprises an optical pickup 21, a wobble detection circuit 22, an absolute time in pre-groove (ATIP) decoder 23, a memory 24, a central control block 25 implemented by a central processing unit (CPU), a strategy generation circuit 26 and a laser diode (LD) driving circuit 27.

On the recording area of the optical disc 1, there is formed a wavy track in the form of a spiral shape. The waviness of the track, generally referred to as wobble, represents an absolute time information referred to as ATIP data, wherein the ATIP data is modulated by frequency-shift keying (FSK) such that the frequency is shifted between one of two frequencies of 22.05±1 KHz at every one bit duration (7 periods of 44.1 KHz) depending on whether a bit is 1 or 0.

The ATIP data is composed of a plurality of consecutive frames, wherein each frame includes a bit stream of a predetermined number of bits (e.g., 84 bits) having a fixed pattern of frame synchronization signal at a predetermined position, each frame repeating with a period of a frequency of 75 Hz. Further, the ATIP data includes a disc code by which the type of the optical disc 1 can be determined.

The optical pickup 21 includes a laser diode (LD), a four-divisional photodetector, an actuator for an object lens and so on. The optical pickup 21 can move along the radial direction of the optical disc 1, e.g., by a linear motor type slidable transport mechanism (not drawn), under the control of the CPU 25.

The wobble detection circuit 22 detects a wobble signal included in a reproduced signal outputted from the output signals of the optical pickup 21 to provide same to the ATIP decoder 23.

The ATIP decoder 23 reproduces the ATIP data from the wobble signal to provide the reproduced ATIP data to the CPU 25.

The memory 24 is implemented by a memory device, such as a semiconductor memory device, a magnetic disc or an optical disc, and a control circuit thereof; and stores required initial optical intensity data sets obtained, e.g., by experiments in accordance with the present invention.

Each initial intensity data set is stored for every corresponding disc code identifying a type of a disc. Further, each initial intensity data set includes, for every different information recording velocity (e.g., linear velocity), strategy data, initial values of recording and bottom powers and a matching coefficient β. The strategy data represents a modified shape of recording pulses and includes information required to set up, for example, a serrated pulses, comb-shape pulses or the like. The recording power is a power or an intensity of the laser beam applied when to form pits during the recording of the optical information and the bottom power is a power or an intensity of the laser beam applied when not to form pits during the recording of the optical information. In each initial intensity data set, the initial value of the bottom power is set to have a larger value for a greater linear velocity. The matching coefficient β is a measure of desired quality of the pits and lands formed in the optical disk, which is obtained from the output of the photodetector.

The term "linear velocity" used herein represents a relative velocity of a laser beam source with respect to an optical information recording medium.

The CPU 25 extracts the absolute time and the disc code from the ATIP data; identifies the type of the optical disc based on the disc code; selects an initial intensity data set corresponding to the disc code; and sets the LD driving circuit 27 with initial values of recording and bottom powers obtained based on the selected initial intensity data set. Next, the CPU 25 performs optimum power control (OPC). Thereafter, the CPU 25 sets the LD driving circuit 27 with the values of recording and bottom powers determined based on the OPC; generates a digital or a recording signal corresponding to the optical information to be recorded based on selected initial intensity data set; and outputs the recording signal and the strategy data to the strategy generation circuit 26 to thereby record the optical information.

The strategy generation circuit 26 modifies the recording signal based on the strategy data from the CPU 25 to thereby provide the modified digital signal (to be referred to as the modified recording signal) to the LD driving circuit 27.

The LD driving circuit 27 drives the laser diode based on the modified recording signal fed from the strategy generation circuit 26 to irradiate the laser beam on the optical disc 1 with the recording and the bottom powers set by the CPU 25. In recording the optical information under the control of the LD driving circuit 27, the laser diode in the optical pickup 21 radiates the laser beam of the recording power for enabling the pit formation when the modified recording signal is at the high level, and radiates the laser beam of the bottom power for disabling the pit formation (i.e., enabling the land formation) but capable of preheating the optical disc when the modified recording signal is at the low level. During reproduction or playback of the recorded optical information, the LD driving circuit 27 drives the laser diode to generate the laser beam of an intensity, e.g., about 0.7 mW, which is lower than that of the bottom power. The intensity of the laser beam used for the playback of the recorded optical information will be referred to as the playback laser power hereinafter.

Figure 5:
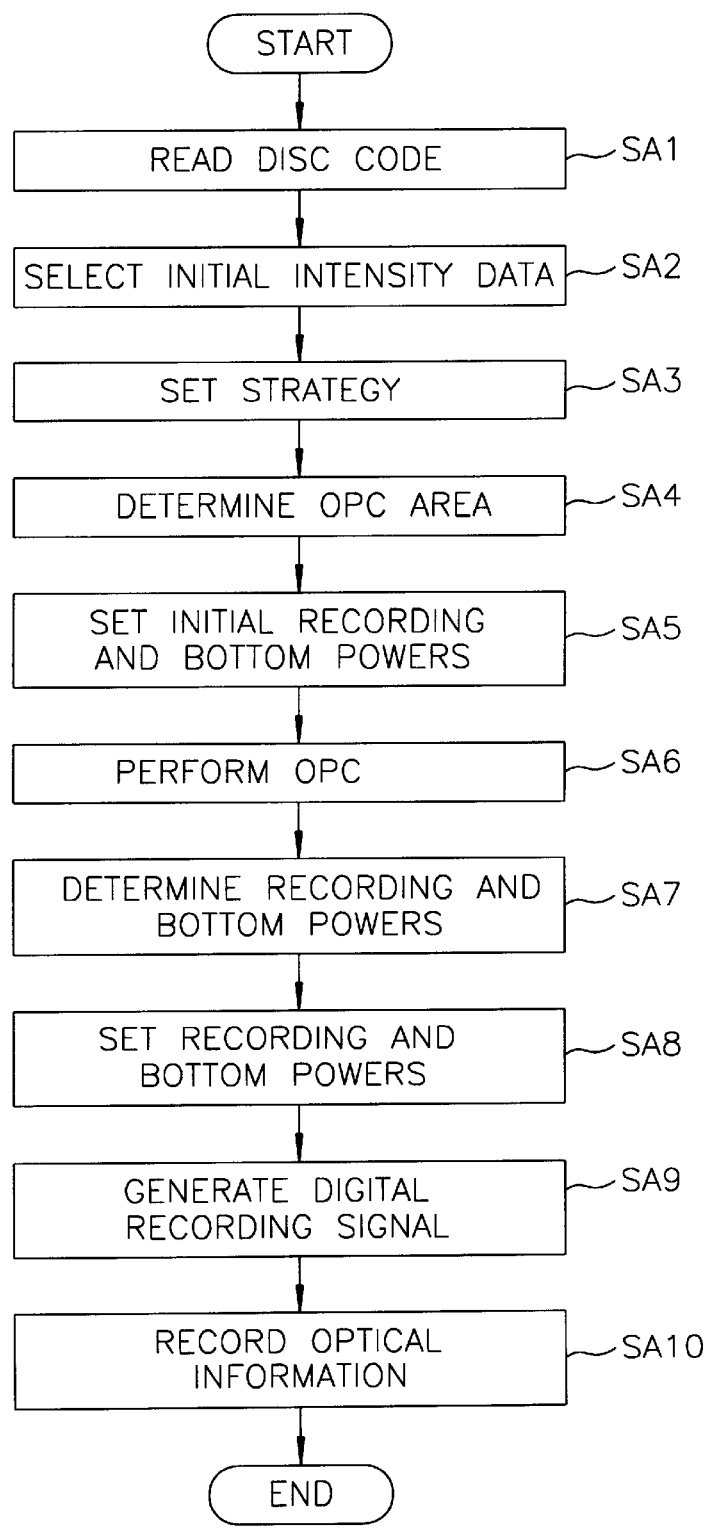
FIG. 5 shows a flow chart for illustrating an optical information recording method in accordance with a first embodiment of the present invention.

The operation of the optical information recording apparatus 2 having the aforementioned configuration will be described in detail with reference to the flow chart of FIG. 5.

If optical information to be recorded is determined and the recording is initiated by an operator, the CPU 25 reads a disc code from ATIP data (SA1) and selects an initial intensity data set corresponding to the disc code from the contents of the memory 24 (SA2). Thereafter, the CPU 25 sets the strategy generation circuit 26 with strategy data defined in the selected initial intensity data set (SA3). As described above, strategy data, initial values of recording and bottom powers and a matching coefficient β are specified for every possible linear velocity in the initial intensity data set, so that the strategy data to be used in setting the strategy generation circuit 26 can be selected based on the linear velocity to be used in recording the optical information. Thus, the strategy data can be properly selected depending on the type of the optical disc 1 and the linear velocity to be used. The recording velocity can be preset in the apparatus 2 or can be selected by the operator before the start of the recording.

The CPU 25 determines an OPC area of the optical disc 1 to be used in performing OPC (SA4); sets the LD driving circuit 27 with the initial values of recording and bottom powers specified in the initial intensity data set for the linear velocity to be used in recording the optical information (SA5); and performs the OPC (SA6).

The OPC is performed by recording predetermined test information in a power calibration area (PCA) of the optical disc 1 and then by reproducing the recorded test information. The PCA divided into a test area and a count area, each of the areas being divided into 100 partitions. Each partition of the test area is composed of 15 frames and one partition is used in recording the test information. In this embodiment, 15 different sets of a recording and a bottom powers are determined based on the initial recording and bottom powers and used to record the test information in different 15 frames of a partition as described in the orange book, i.e., the specification of the CD-R.

In the preferred embodiment of the invention, laser powers of different sets can be set to have recording powers identical to the initial recording power while varying the bottom powers around the selected initial bottom power, or vice versa. Optionally, both the recording and the bottom powers can be set to vary therearound to have different values from those of the initial recording and bottom powers.

The CPU 25 determines optimum recording and the bottom powers based on the OPC results (SA7) and sets the LD driving circuit with the determined optimum recording and bottom powers (SA8).

Determination scheme of the laser powers based on the OPC results is well known in the art and, therefore, will not be repeated herein for the sake of simplicity. However, it is to be understood to one skilled in the art that laser powers in a set producing a best recording quality are selected as the optimum recording and bottom powers. In this embodiment, a set of laser powers yielding a matching coefficient closest to the one selected based on the disk type and the recording velocity is preferably determined as the set producing the best recording quality. Alternatively, laser powers of a set producing reproduced test information identical to the recorded test information can be determined as the optimum power. The optimum power also can be estimated from OPC data (i.e., the matching coefficients produced by the sets of laser powers used in the OPC) such that the estimated optimum recording and bottom powers are expected to have a matching coefficient identical to that corresponding to the linear velocity to be used as specified in the selected initial intensity data set.

Subsequently, the CPU 25 performs the eight-to-fourteen modulation (EFM) on the optical information to be recorded to generate a digital signal (recording signal) (SA9) and provides same to the strategy generation circuit 26 to record the optical information (SA10).

Figure 6:
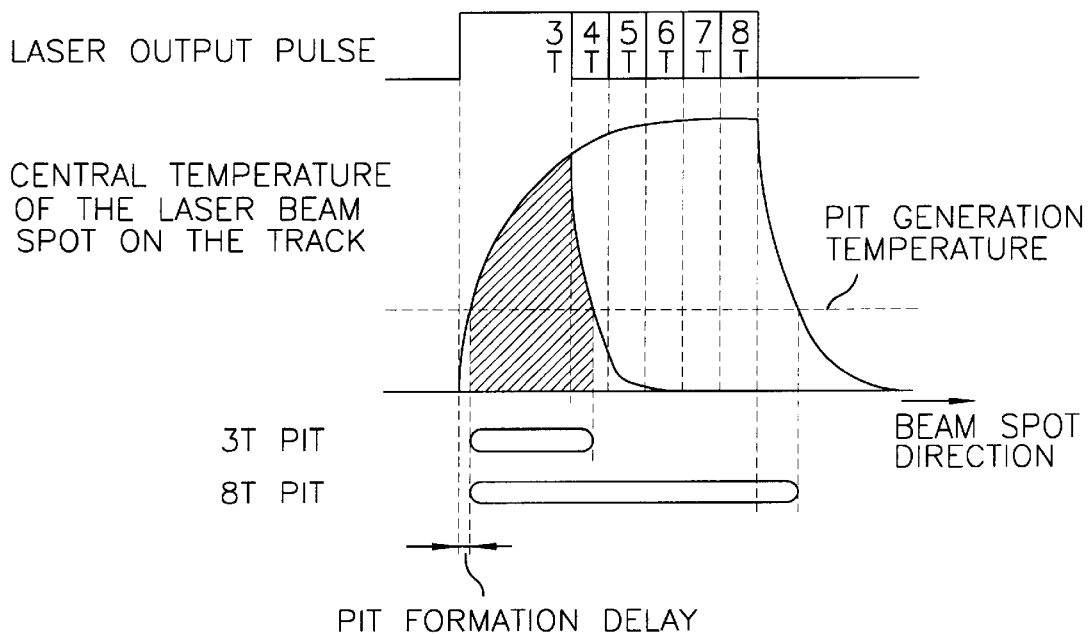
FIG. 6 is a diagram for illustrating the pit formation according to a conventional high speed recording method.

As a result, pits can be formed without substantially increasing the recording power since the initial bottom powers specified in the initial intensity data are set to have greater values with increasing linear velocities. That is, while a pit is formed on the optical disc 1 with the laser beam of the recording power, excessive thermal energy is transferred into neighboring regions of the pit to thereby preheat a portion of the recording medium in which a next pit is to be formed. However, if the bottom power is set to be low as in the prior art during high speed recording, the central temperature of the laser beam spot on the track of the optical disc 1 due to the illumination of the laser beam of the recording power decreases as the linear velocity between the optical disc 1 and the optical pickup 21 increases, as illustrated in FIG. 6. As a result, the extra thermal energy transferred to the neighboring regions of the pit decreases, resulting in increased delay of the pit formation after the onset of a next laser output pulse or incomplete pit formation.

Figure 7:
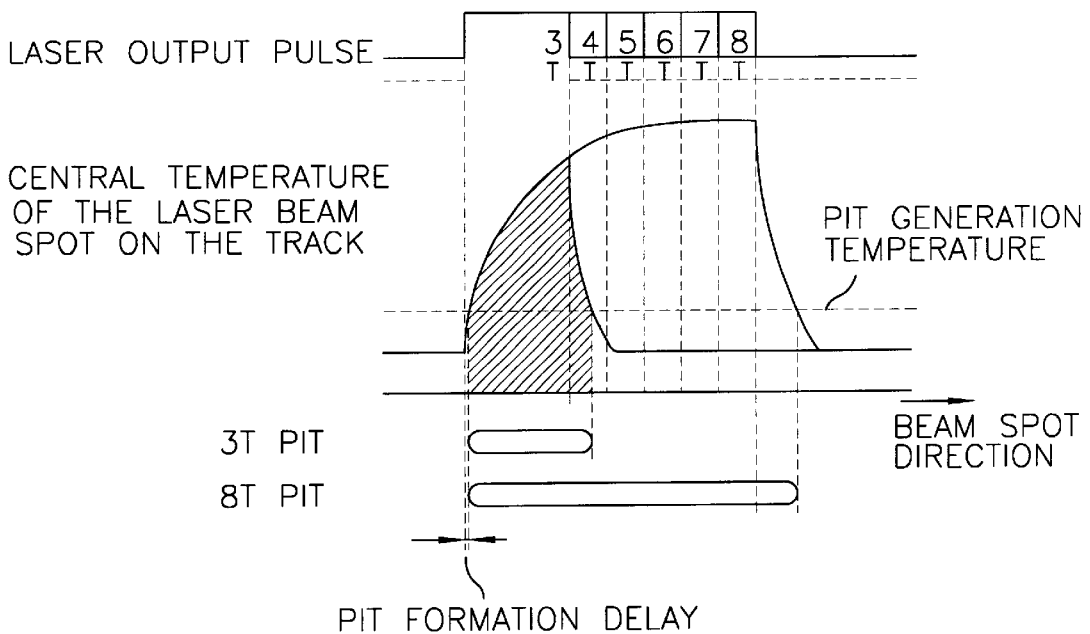
FIG. 7 shows a diagram for illustrating the pit formation in accordance with a high speed recording method of the present invention.

In this embodiment, however, the bottom power of the laser beam being irradiated between two neighboring pits is set to be higher than that in the prior art as illustrated in FIG. 7, enabling the optical disc 1 to be preheated.

In other words, since the bottom power or a second intensity, i.e., an intensity of a laser beam irradiated during the low level of the modified digital recording signal fed from the strategy generation circuit 26, is set to be higher with the increased linear velocity, the optical disc 1 can be sufficiently preheated even though the information recording is carried out at a speed of, e.g., 2 to 6 times faster than the conventional recording speed. As a result, pits can be formed without having to extremely increase the recording power or a first intensity, i.e., an intensity of laser beam required to form pits.

Further, since the initial intensity data sets obtained beforehand are prestored in the memory 24, it is possible to reduce a time required in adjusting the laser powers at the initial stage of recording the optical information.

Still further, the initial intensity data sets are specified for possible types of the optical disc 1, so that the first and the second intensities can be set in a short time regardless of a type of an optical disk to be used in recording the optical information.

Moreover, since the digital signal is modified based on the type of the optical disc 1 by the strategy generation circuit 26, pits can be formed in an optimum shape and the time required in adjusting the intensities of the laser beams can be further reduced.

The second embodiment of the present invention will now be described.

The configuration of the optical information recording apparatus in accordance with the second embodiment is identical to that of the first embodiment shown in FIG. 4. The second embodiment, however, differs from the first embodiment in that the initial value of bottom power is not specified the initial intensity data.

In the second embodiment, an initial intensity data set corresponding to each of different disc codes is stored in the memory 24 as in the first embodiment.

The initial intensity data set for each disc code includes strategy data, an initial value of the recording power, a matching coefficient $\beta$ and a bottom power ratio for each information recording velocity (e.g., linear velocity). The bottom power ratio represents a ratio of the bottom power to the recording power, wherein the recording power is an intensity of a laser beam required to form pits during recording the optical information and the bottom power is an intensity of a laser beam applied in forming lands in lieu of pits during the recording of the optical information. In the initial intensity data set, the bottom power ratio is set to be within an experimentally determined most preferable range, e.g., from about 5% to about 15% of the recording power, and is set to have a large value for a greater linear velocity.

In the second embodiment, a first OPC is carried out based on the initial recording power and a preset bottom power at the initial stage of recording the optical information. Thereafter, an optimum recording power is determined from the result of the first OPC and then a second OPC is carried out based on the determined recording power and a bottom power, which is obtained by multiplying the bottom power ration by the determined recording power, thereby determining an optimum bottom power.

Figure 8:
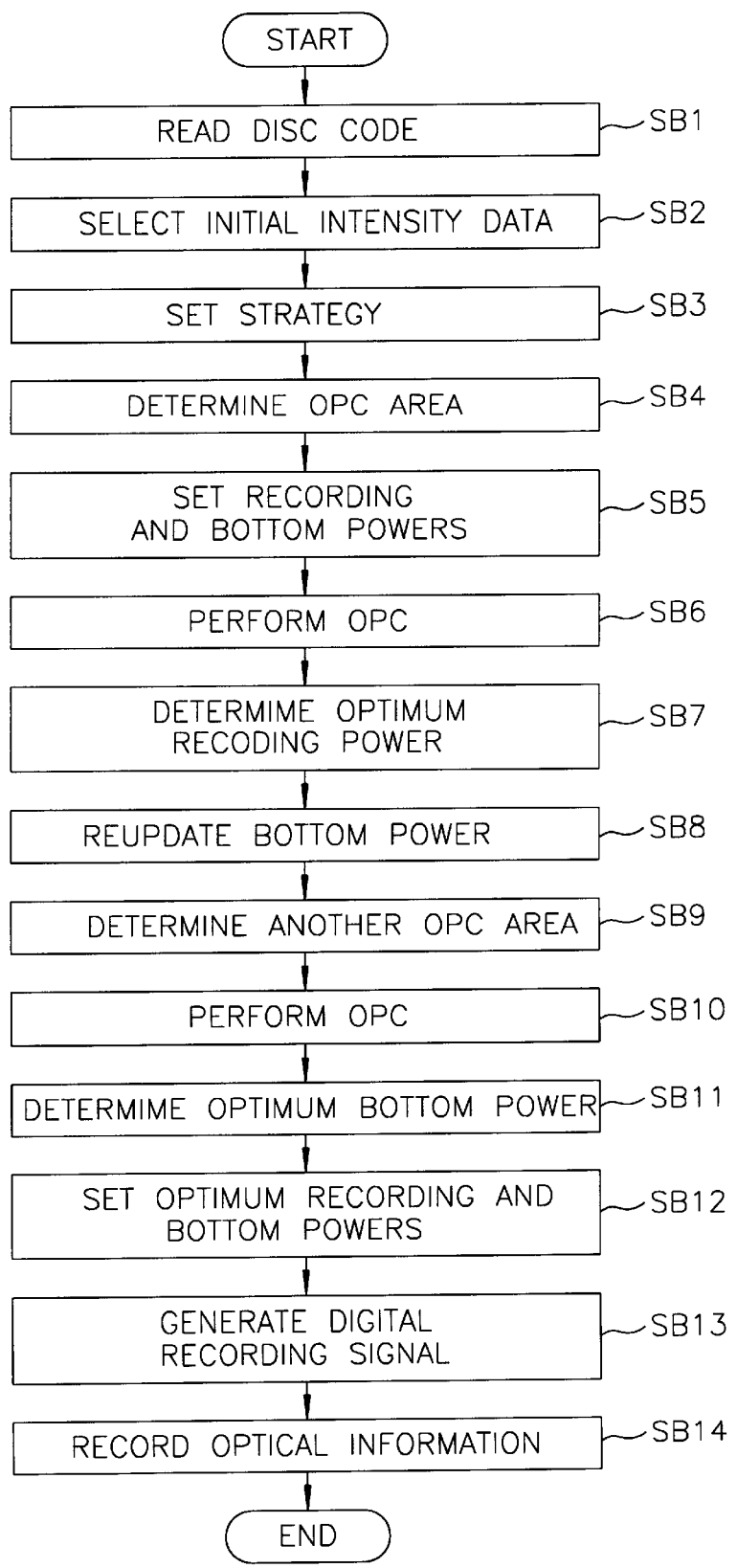
FIG. 8 shows a flow chart for illustrating an optical information recording method in accordance with a second embodiment of the present invention.

Referring to FIG. 8, there is described a detailed procedure for determining the recording and the bottom powers and thereby recording the optical information in accordance with the second embodiment of the invention.

If optical information to be recorded is determined and the recording is initiated by an operator, the CPU 25 reads a disc code from ATIP data (SB1) and selects an initial intensity data set corresponding to the disc code from the contents of the memory 24 (SB2).

Thereafter, the CPU 25 sets the strategy generation circuit 26 with strategy data defined in the selected initial intensity data set for a linear velocity to be used in recording the optical information (SB3). Thus, the strategy data can be properly selected depending on the type of the optical disc 1 and the linear velocity to be used. As in the first embodiment, the recording velocity can be preset in the apparatus 2 or can be selected by the operator before the start of the recording as in the first embodiment.

The CPU 25 then determines an OPC area of the optical disc 1 to be used in performing the first OPC (SB4); sets the LD driving circuit 27 with the preset bottom power and the initial recording power specified in the initial intensity data for the linear velocity to be used in recording the optical information (SB5); and performs the first OPC (SB6). In this embodiment, the preset bottom power used in the first OPC is preferably set to be, for example, about 0.7 mW, which is identical to the playback laser power to be used in reproducing the recorded optical information.

Next, the CPU 25 determines an optimum recording power based on the result of the first OPC (SB7).

Subsequently, the CPU 25 calculates an approximate bottom power by multiplying the determined recording power by the bottom power ratio defined in the initial intensity data set for the linear velocity to be used and resets the LD driving circuit 27 with the calculated approximate bottom power and the determined optimum recording power (SB8).

In the next step, the CPU 25 determines another OPC area of the optical disc 1 to be used in performing the second OPC (SB9); and performs the second OPC (SB10).

The second OPC is carried out with a plurality of, e.g., 5, sets of laser powers, wherein each set of laser powers includes the optimum recording power and an adjusted bottom power. The adjusted bottom powers of the sets are determined based on the bottom power ratio with a predetermined increment. For instance, if the bottom power ratio is 5% and the increment is 1%, the adjusted bottom powers would have values of 5, 6, 7, 8 and 9% of the optimum recording power when the second OPC is performed by 5 sets of laser powers.

The CPU 25 determines an optimum bottom power based on the result of the second OPC (SB11).

The CPU 25 sets the LD driving circuit 27 with the optimum recording and the optimum bottom powers determined by the first and the second OPCs (SB12).

Thereafter, CPU 25 performs the EFM on the optical information to be recorded to thereby generate a digital signal (recording signal) (SB13) and provide same to the strategy generation circuit 26, thereby recording the optical information (SB14).

The second embodiment would provide similar effects to those of the first embodiment.

The third embodiment of the present invention will now be described.

The configuration of the optical information recording apparatus in accordance with the third embodiment is identical to that of the first embodiment shown in FIG. 4. The third embodiment is different from the second embodiment in that both the optimum recording power and the optimum bottom power are determined simultaneously after performing the OPC twice.

In the third embodiment, an initial intensity data set corresponding to each of different disc codes is stored in the memory 24 as in the first and the second embodiments.

The initial intensity data set for each disc code include strategy data, an initial value of the recording power, a matching coefficient β and a bottom power ratio for each information recording velocity(e.g., linear velocity, as in the second embodiment). The bottom power ratio represents a ratio of the bottom power to the recording power, wherein the recording power is an intensity of laser beam required to form pits during recording the optical information and the bottom power is an intensity of laser beam applied in forming lands instead of pits during recording the optical information. In the initial intensity data set, the bottom power ratio is set to be within an experimentally determined most preferable range, e.g., from about 5% to about 15% of the recording power, and is set to have a larger value for a greater linear velocity.

In the third embodiment, a first OPC is carried out based on the initial recording power and a predetermined bottom power at the initial stage of recording the optical information. Thereafter, an approximate value of the recording power is determined based on the result of the first OPC. A second OPC is then carried based on the determined approximate recording power and an approximate bottom power, which is obtained by multiplying the approximate recording power by the bottom power ratio. Finally, an optimum recording power and an optimum bottom power are determined from the result of the second OPC.

Figure 9:
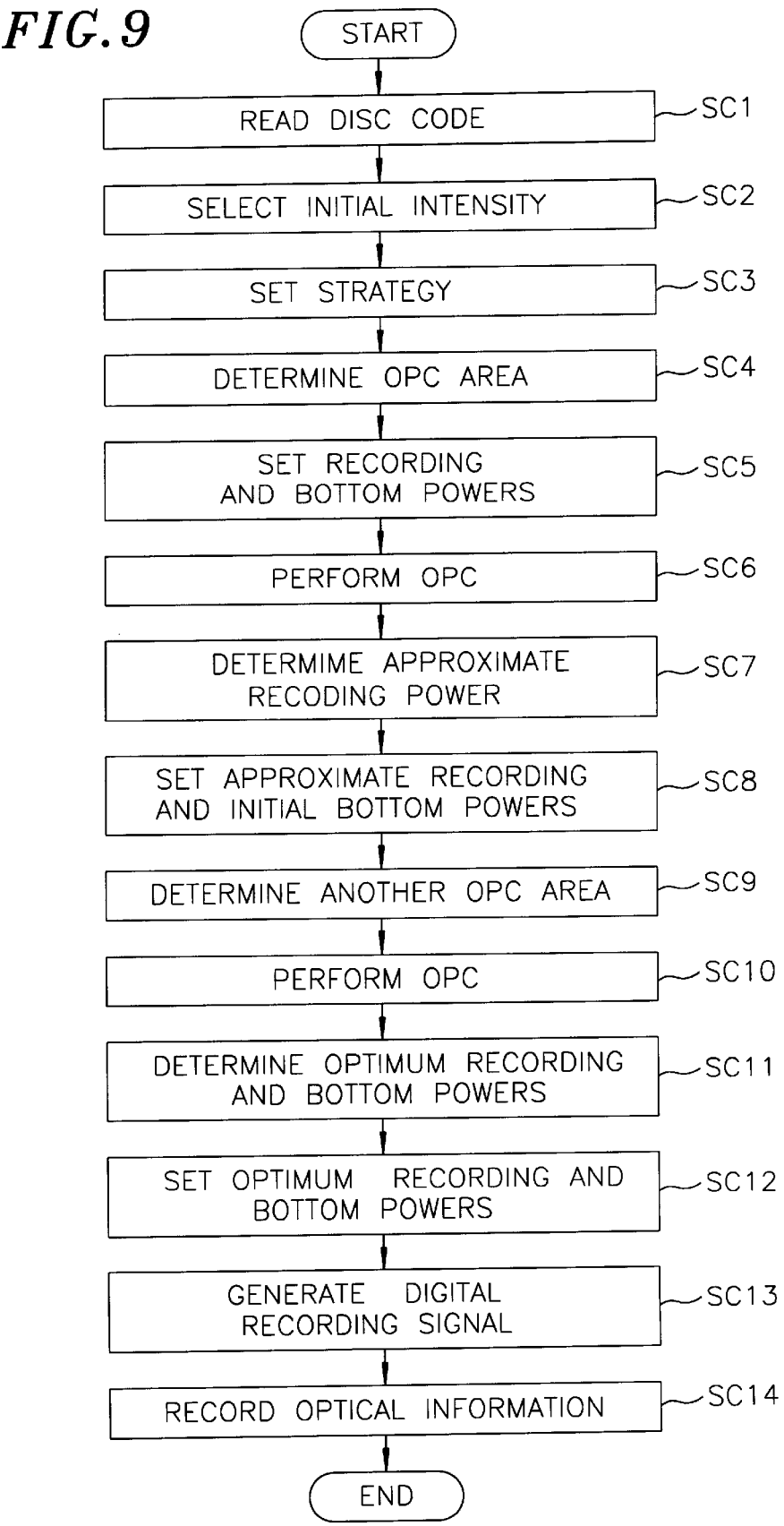
FIG. 9 shows a flow chart for illustrating an optical information recording method in accordance with a third embodiment of the present invention.

Referring to FIG. 9, there is described a detailed procedure for determining the recording and the bottom powers and thereby recording the optical information in accordance with the third embodiment of the invention.

If optical information to be recorded is determined and the recording is initiated by an operator, the CPU 25 reads a disc code from ATIP data (SC1) and selects an initial intensity data set corresponding to the disc code from the contents of the memory 24 (SC2).

Thereafter, the CPU 25 sets the strategy generation circuit 26 with strategy data defined in the selected initial intensity data set for a linear velocity to be used in recording the optical information (SC3). Thus, the strategy data can be properly selected depending on the type of the optical disc 1 and the linear velocity to be used. The recording velocity can be preset in the apparatus 2 or can be selected by the operator before the start of the recording as in the first and the second embodiments.

The CPU 25 determines an OPC area of the optical disc 1 to be used in performing the first OPC (SC4); sets the LD driving circuit 27 with the predetermined bottom power and the initial value of recording power specified in the initial intensity data for the linear velocity to be used in recording the optical information (SC5); and performs the first OPC (SC6). In this embodiment, the predetermined bottom power used in the first OPC is preferably set to be, for example, about 0.7 mW, which coincides with the playback laser power.

Next, the CPU 25 determines the approximate value of recording power based on the result of the first OPC (SC7).

Thereafter, the CPU 25 calculates an approximate value of the bottom power by multiplying the approximate recording power by the bottom power ratio defined in the initial intensity data for the laser velocity to be used and resets the LD driving circuit 27 with the approximate bottom power and the approximate recording power (SC8).

The CPU 25 then determines another OPC area of the optical disc 1 to be used in performing the second OPC (SC9) and performs the second OPC (SC10).

The second OPC is carried out in P, e.g., 3 steps. In each step, OPC is preferably performed by using a fixed bottom power while varying recording powers around the determined approximate recording power. Fixed bottom powers in the P steps are determined based on the determined approximate bottom power with a predetermined increment and preferably are set to be limited within the range from about 5% to about 15% of the approximate recording power. For instance, if the bottom power ratio is 6%, the fixed bottom power being used in the 3 steps can be set as 6, 9 and 12% of the approximate recording power.

The CPU 25 determines both the optimum recording power and the optimum bottom power based on the result of the second OPC (SC11).

Subsequently, the CPU 25 sets the LD driving circuit 27 with the optimum recording and the optimum bottom powers determined by the second OPC (SC12).

The CPU 25 then performs the EFM on the optical information to be recorded to thereby generate a digital signal (recording signal) (SC13) and provide same to the strategy generation circuit 26, thereby recording the optical information (SC14).

The third embodiment would also provide similar effects as in the first embodiment.

The fourth embodiment of the present invention will be described.

The configuration of the optical information recording apparatus in accordance with the fourth embodiment is identical to that of the first embodiment shown in FIG. 4. The fourth embodiment is different from the third embodiment in that a greater bottom power is employed in forming a longer land.

Figure 10:
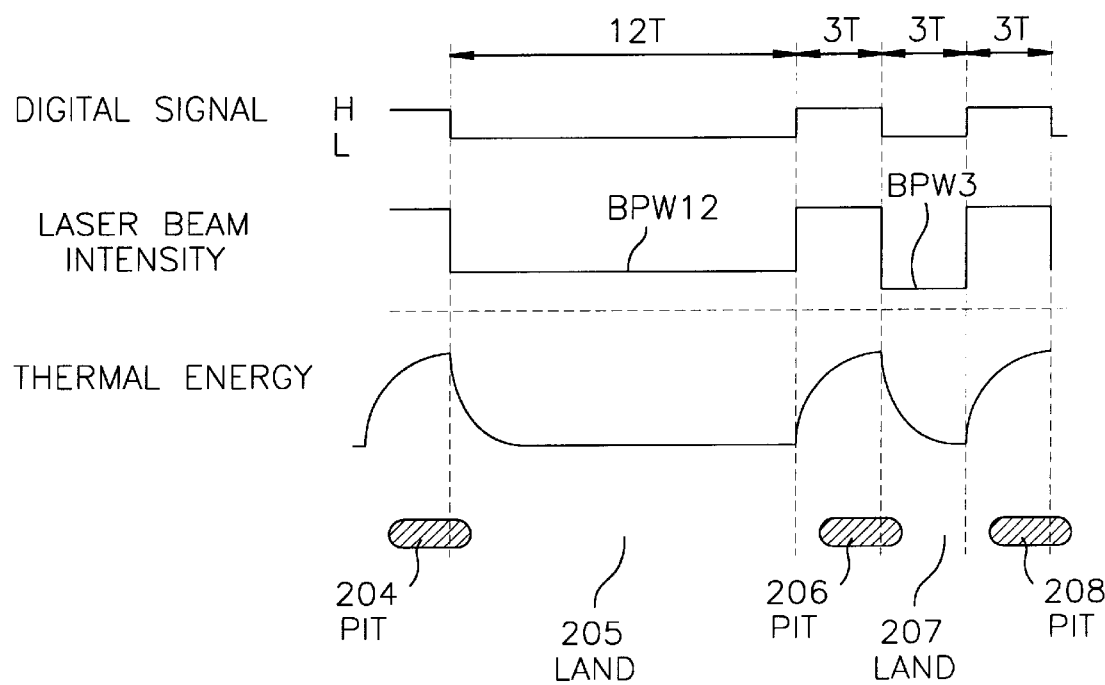
FIG. 10 shows a diagram for outlining an optical information recording method in accordance with a fourth embodiment of the present invention.

In the previous embodiments, the bottom power is set to increase as a linear velocity becomes greater as described above in order to provide sufficient preheating of a region in which a next pit is to be formed even at an increased linear velocity. Since, however, it takes longer time to begin to form a next pit when a land between two pits is longer, a greater amount of thermal energy applied in the optical disc 1 is dissipated through the air so that the thermal energy retained in the optical disc 1 reduces. In order to minimize variations of the thermal energy retained in the optical disc 1 due to a varying length of a land, the bottom power of the fourth embodiment is set to increase in proportion to the length of a land as depicted in FIG. 10. For instance as depicted in FIG. 10, the bottom power BPW12 to form a 12T-long land 205 preceding a 3T-long pit 206 is set to be higher than the bottom power BPW3 to form a 3T-long land 207 preceding a 3T-long pit 208.

Therefore, dissipation of excess thermal energy provided during forming a preceding pit, e.g., 204, which increases as a subsequent land becomes longer, can be compensated by the increased bottom power so that the optical disc 1 can be sufficiently preheated, resulting in quality pits being formed.

In the fourth embodiment, an initial intensity data set for each different disc code is stored in the memory 24 as in the previous embodiments.

In the fourth embodiment, an initial intensity data set for each disc code includes strategy data, an initial value of the recording power, a matching coefficient β and a bottom power ratio as in the third embodiment and further includes a bottom power modification ratio set for each information recording speed (e.g., linear velocity).

The bottom power ratio in this embodiment represents a ratio of a 3T bottom power to a recording power, wherein the recording power is an intensity of the laser beam required to form the pits during recording the optical information and the 3T bottom power is an intensity of the laser beam required to form a land of a 3T length, T being, e.g., a minimum laser pulse duration.

In the initial intensity data set, the bottom power ratio is set to be within an experimentally determined most preferable range, e.g., from about 5% to about 15% of the recording power, and is set to have a larger value for a greater linear velocity.

The bottom power modification ratio set includes a multiplicity of modification ratios, each modification ratio specifies a ratio of a specific bottom power to an optimum 3T bottom power to be determined by an OPC, wherein the specific bottom power is a power to be used in forming a land with a specific length. A modification ration is set to have a greater value for a longer land.

In the fourth embodiment, a first OPC is carried out based on the initial recording power and a predetermined bottom power at the initial stage of recording the optical information. Thereafter, an approximate value of the recording power is determined based on the result of the first OPC. A second OPC is then carried out based on the determined approximate recording power and an approximate bottom power, which is obtained by multiplying the approximate recording power by the bottom power ratio. Finally, an optimum recording power and an optimum 3T bottom power are determined from the result of the second OPC. The optical information is recorded by using the optimum recording power and specific bottom powers, each specific bottom power being determined by multiplying the optimum 3T bottom power by a modification ratio corresponding to a length of a land to be formed.

Figure 11:
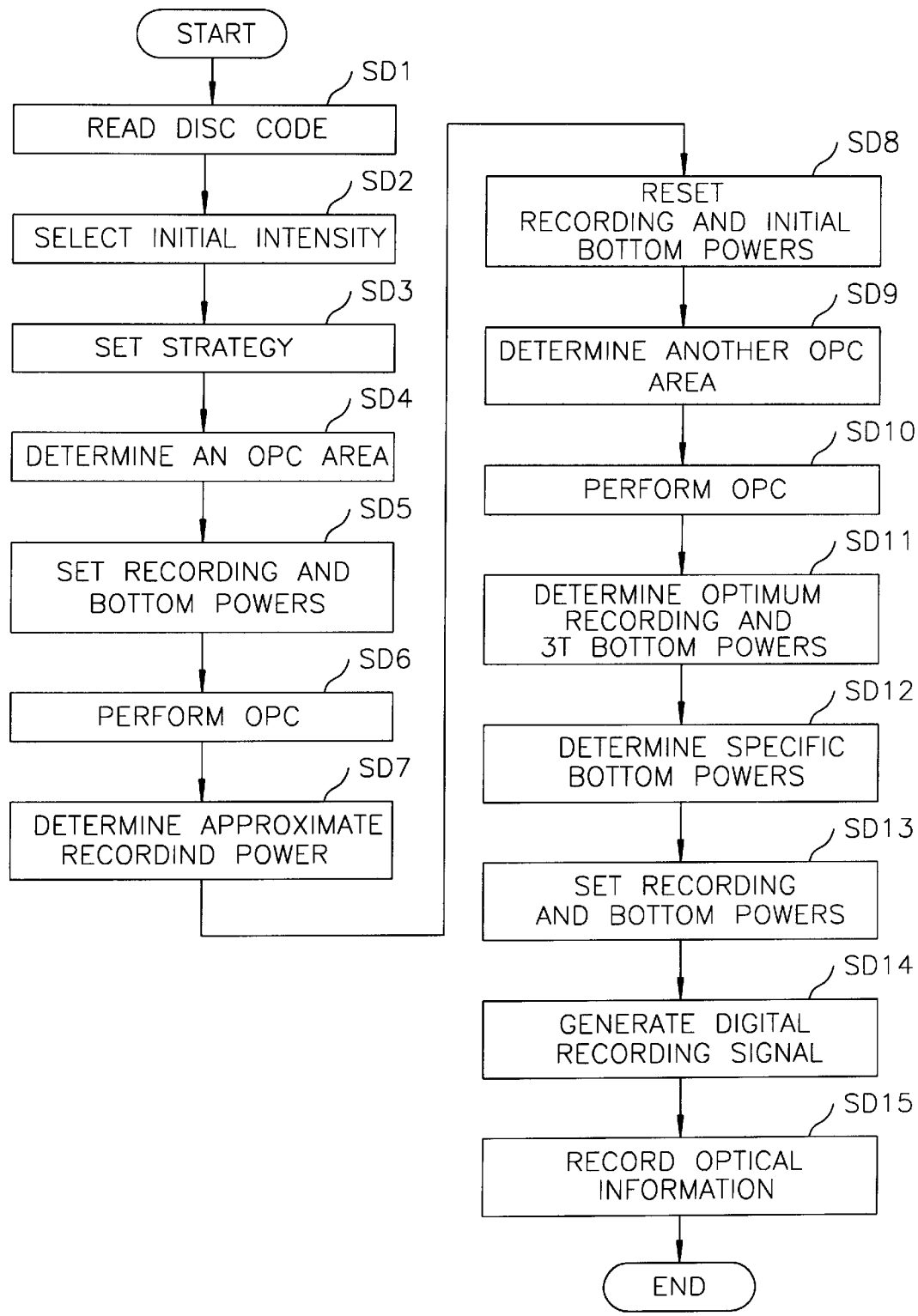
FIG. 11 shows a flow chart for illustrating an optical information recording method in accordance with a fourth embodiment of the present invention.

Referring to FIG. 11, there is described a detailed procedure for determining the recording and the bottom powers and thereby recording the optical information in accordance with the fourth embodiment of the invention.

If optical information to be recorded is determined and the recording is initiated by an operator, the CPU 25 reads a disc code from ATIP data (SD1) and selects an initial intensity data set corresponding to the disc code from the contents of the memory 24 (SD2).

Thereafter, the CPU 25 sets the strategy generation circuit 26 with strategy data defined in the selected initial intensity data set for a linear velocity to be used in recording the optical information (SD3). Thus, the strategy data can be properly selected according to the type of the optical disc 1 and the linear velocity to be used.

The CPU 25 then determines an OPC area of the optical disc 1 to be used in performing the first OPC (SD4); sets the LD driving circuit 27 with the predetermined bottom power and the initial value of the recording power specified in the selected initial intensity data set for the linear velocity to be used in recording the optical information (SD5); and performs the first OPC (SD6). In this embodiment, the predetermined bottom power used in the first OPC is preferably set to be, for example, about 0.7 mW, which is identical to the playback laser power.

Next, the CPU 25 determines the approximate value of recording power based on the result of the first OPC (SD7).

Thereafter, the CPU 25 calculates an approximate value of bottom power by multiplying the approximate recording power by the bottom power ratio defined in the initial intensity data for the linear velocity to be used and resets the LD driving circuit 27 with the approximate bottom power and the approximate recording power (SD8).

The CPU 25 then determines another OPC area of the optical disc 1 to be used in performing the second OPC (SD9); and performs the second OPC in a similar manner as in the third embodiment (SD10).

Subsequently, the CPU 25 determines both the optimum recording power and the optimum 3T bottom power BPW3 based on the result of the second OPC (SD11).

Then, the CPU 25 multiplies the 3T bottom power BPW3 by the modification ratios to generate specific bottom powers for forming lands of different specific length (SD12).

In the next step, the CPU 25 sets the LD driving circuit 27 with the optimum recording power and the specific bottom powers (SD13) The CPU 25 then performs the EFM on the optical information to be recorded to thereby generate a digital signal (recording signal) (SD14) and provide same to the strategy generation circuit 26, thereby recording the optical information (SD15).

The fourth embodiment would also have similar effects as in the previous embodiments and provides an optimum bottom power according to a varying length of a land.

While the present invention has been described with respect to the particular embodiments, it will be apparent to those skilled in the art that various changes and modifications may be made without departing from the spirit and scope of the invention as defined in the following claims.

What is claimed is:

1. A method for recording optical information on an optical information recording medium, wherein optically detectable pits and lands having various lengths are defined by thermal energy provided by a pulsed laser beam irradiated on the optical information recording medium by a light source which has a first intensity level for defining a pit and a second intensity level for defining a land, the second intensity level being lower than the first intensity level, characterized in that the second intensity level is set corresponding to linear velocity of the medium, wherein the method comprises the steps of:

storing initial intensity data which includes linear velocities and initial values of the first and the second intensity levels for each linear velocity;

at the beginning of recording the optical information, selecting the initial values of the first and the second intensity levels corresponding to a linear velocity to be used in recording the optical information from the initial intensity data;

recording test information on the optical information recording medium based on the selected initial values of the first and the second intensity levels and reproducing the recorded test information to thereby determine optimum values of the first and the second intensity levels; and setting the light source with the optimum values of the first and the second intensity levels.

2. The method of claim 1, wherein the second intensity level is set corresponding to length of the land.

3. The method of claim 1, wherein initial intensity data sets are specified for various types of optical information recording mediums, each data set corresponding to one of the various types, and a data set corresponding to a type of the optical information recording medium to be used in recording the optical information is selected to be used.

4. The method of claim 1, wherein initial intensity data sets are specified for various types of optical information recording mediums, each data set corresponding to one of various types and including modification data corresponding to a linear velocity, and the light source and the modification data specifying a form of a modified digital signal; and wherein a data set corresponding to a type of the optical information recording medium to be used in recording the optical information is selected to be used and the optical information is recorded by using the modified digital signal, the modified digital signal being produced by modifying the digital signal based on modification data specified in the selected data set.

5. A method for recording optical information on an optical information recording medium, wherein optically detectable pits and lands having various lengths are defined by thermal energy provided by a pulsed laser beam irradiated on the optical information recording medium by a light source which has a first intensity level for defining a pit and a second intensity level for defining a land, the second intensity level being lower than the first intensity level, characterized in that the second intensity level is set corresponding to linear velocity of the medium, wherein the method comprises the steps of:

storing initial intensity data which includes linear velocities and an initial value of the first intensity level for each linear velocity;

at the beginning of recording the optical information, selecting an initial value of the first intensity level corresponding to a linear velocity to be used in recording the optical information from the initial intensity data;

recording first test information on the optical information recording medium based on the selected initial value of the first intensity level and a preset value of the second intensity level to be used in reproducing the recorded optical information, and reproducing the recorded first test information to thereby determine an approximate value of the first intensity level;

recording second test information on the optical information recording medium by using the approximate value of the first intensity level and an approximate value of the second intensity level, and reproducing the recorded second test information to thereby determine optimum values of the first and the second intensity levels, wherein the approximate value of the second intensity level is within a range from about 5% to about 15% of the approximate value of the first intensity level; and setting the light source with the optimum values of the first and the second intensity levels.

6. The method of claim 5, wherein the approximate value of the first intensity level is equal to the optimum value of the first intensity level.

7. The method of claim 5, wherein the second intensity level is set corresponding to length of the land.

8. An apparatus for recording optical information on an optical information recording medium, wherein optically detectable pits and lands having various lengths are defined by thermal energy provided by a pulsed laser beam which has a first intensity level for defining a pit and a second intensity level for defining a land, the second intensity level being lower than the first intensity level, the apparatus comprising:

a light source for generating the laser beam; and intensity setting means for setting the second intensity level corresponding to linear velocity of the medium, wherein the intensity setting means includes:

a memory storing initial intensity data which includes linear velocities and initial values of the first and the second intensity levels for each linear velocity;

initial intensity selecting means for selecting, at the beginning of recording the optical information, initial values of the first and the second intensity levels corresponding to a linear velocity to be used in recording the optical information from the initial intensity data;

optimum intensity determining means for recording test information on the optical information recording medium based on the selected initial values of the first and the second intensity levels and reproducing the recorded test information to thereby determine optimum values of the first and the second intensity levels; and setting means for setting the light source with the optimum values of the first and the second intensity levels.

9. The apparatus of claim 8, wherein the second intensity setting means includes means for setting the second intensity level corresponding to length of the land.

10. The apparatus of claim 8, wherein the memory stores a plurality of initial intensity data sets specified for various types of optical information recording mediums, each data set corresponding to one of the various types, and the apparatus further comprising initial intensity data selecting means for selecting from the data sets a data set corresponding to a type of the optical information recording medium to be used in recording the optical information, wherein the initial intensity selecting means selects the initial values of the first and the second intensity levels based on the selected data set.

11. The apparatus of claim 8, wherein the memory stores a plurality of initial intensity data sets specified for various types of optical information recording mediums, each data set corresponding to one of various types and including modification data corresponding to a linear velocity, the modification data specifying a form of modified digital signal, and the apparatus further comprising:

initial intensity data selecting means for selecting from the stored data sets a data set corresponding to a type of the optical information recording medium to be used in recording the optical information to be used; and means for modifying the digital signal based on the modification data specified in the selected data set to generate a modified digital signal, wherein the initial intensity data selecting means selects the initial values of the first and the second intensity levels based on the selected data set; and wherein the light source generates the laser beam in response to the modified digital signal.

12. An apparatus for recording optical information on an optical information recording medium, wherein optically detectable pits and lands having various lengths are defined by thermal energy provided by a pulsed laser beam which has a first intensity level for defining a pit and a second intensity level for defining a land, the second intensity level being lower than the first intensity level, the apparatus comprising:

a light source for generating the laser beam; and intensity setting means for setting the second intensity level corresponding to linear velocity of the medium, wherein the intensity setting means includes:

a memory for storing initial intensity data which includes linear velocities and an initial value of the first intensity level for each linear velocity;

initial intensity selecting means for selecting, at the beginning of recording the optical information, an initial value of the first intensity level corresponding to a linear velocity to be used in recording the optical information from the initial intensity data;

approximate intensity determining means for recording first test information on the optical information recording medium based on the selected initial value of the first initial intensity level and a preset value of the second intensity level to be used in reproducing the recorded optical information, and reproducing the recorded first test information to thereby determine an approximate value of the first intensity level;

intensity determining means for recording second test information on the optical information recording medium by using the approximate value of the first intensity level and an approximate value of the second intensity level, and reproducing the recorded second test information to thereby determine optimum values of the first and the second intensity levels, wherein the approximate value of the second intensity level is within a range from about 5% to about 15% of the approximate value of the first intensity level; and setting the light source with the optimum values of the first and the second intensity levels.

13. The apparatus of claim 12, wherein the approximate value of the first intensity level is equal to the optimum value of the first intensity level.

14. The apparatus of claim 12, wherein the second intensity level is set corresponding to length of the land.

* * * * *